United States Patent

[11] 3,634,853

[72] Inventor Charles P. Hedges
3532 B Midwest Drive, Bryan, Tex. 77801
[21] Appl. No. 44,327
[22] Filed June 8, 1970
[45] Patented Jan. 11, 1972

[54] LIQUID DISPLACEMENT ENCODER
12 Claims, 9 Drawing Figs.
[52] U.S. Cl..................................................... 340/347 P,
73/362, 340/173 CH
[51] Int. Cl....................................................... G08c 9/00
[50] Field of Search............................................. 73/362,
355; 340/347; 235/200, 207; 340/173 CH

[56] References Cited
UNITED STATES PATENTS
3,427,539 2/1969 Mann............................ 340/173 CH
3,249,724 5/1966 Hurwitz........................ 340/173 CH
3,505,872 4/1970 Marolf.......................... 73/362 R
1,601,744 10/1926 Spitzglass..................... 73/362
3,513,313 5/1970 Schwartz...................... 73/355

Primary Examiner—Maynard R. Wilbur
Assistant Examiner—Jeremiah Glassman
Attorney—Smyth, Roston, & Pavitt ABSTRACT: A digitizer is disclosed, wherein the relative change in volume between two fluids is transposed directly into a digital code, in that a pattern of elemental liquid columns in a capillary is displaced relative to a pickup means operating transverse to the capillary. Different arrangements for obtaining higher significant digits as well as doubling the resolution is disclosed.

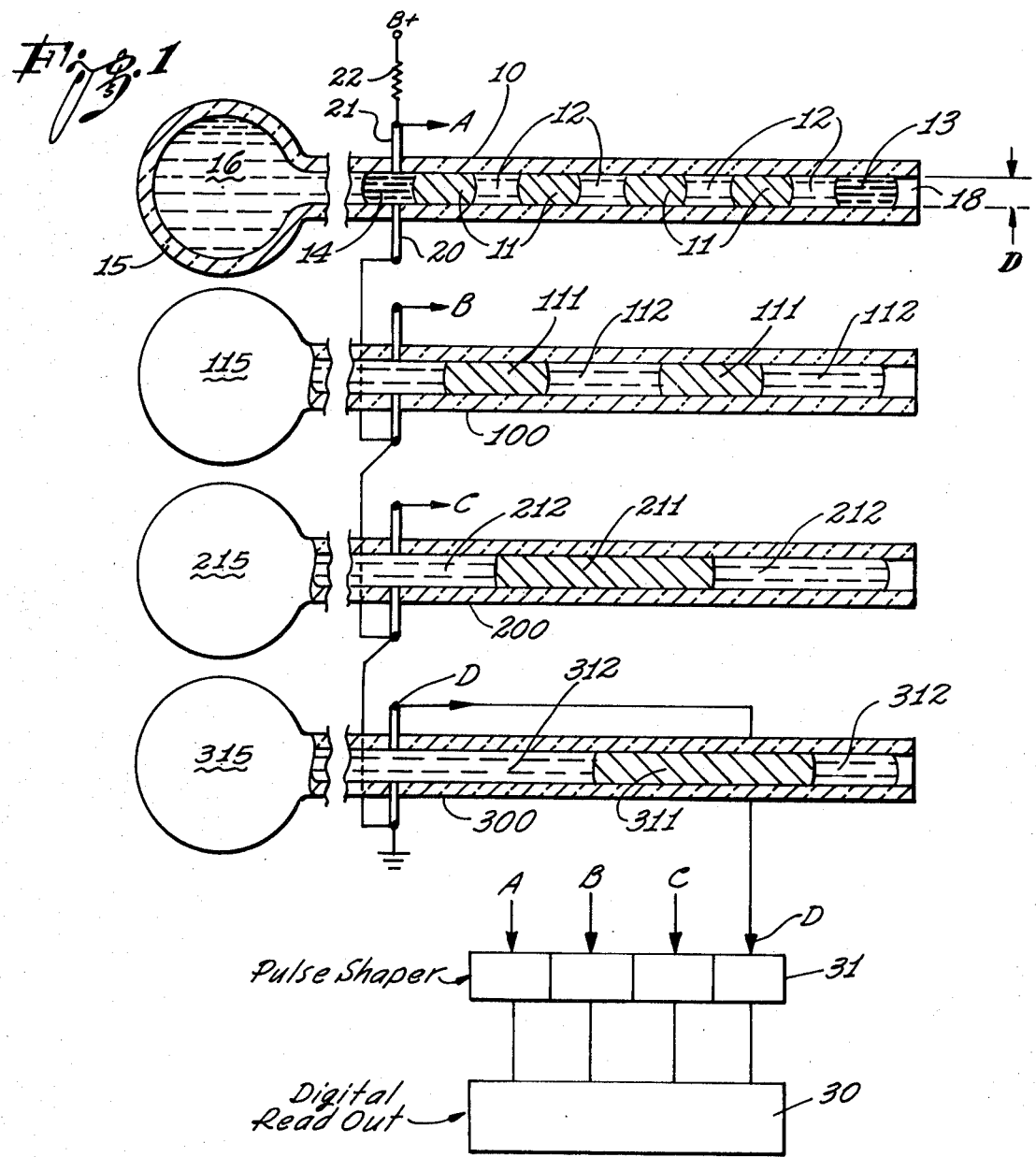
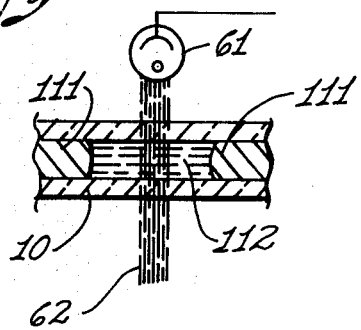
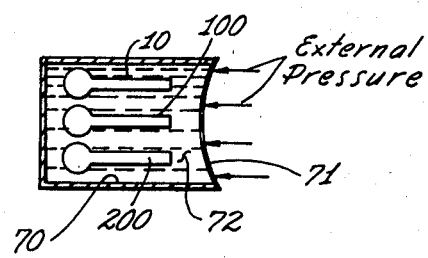

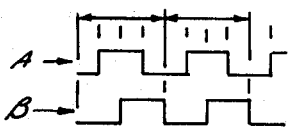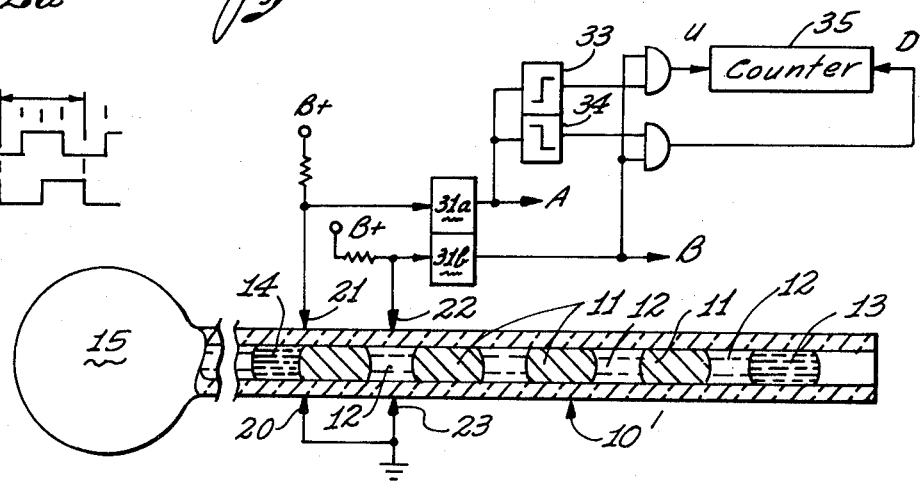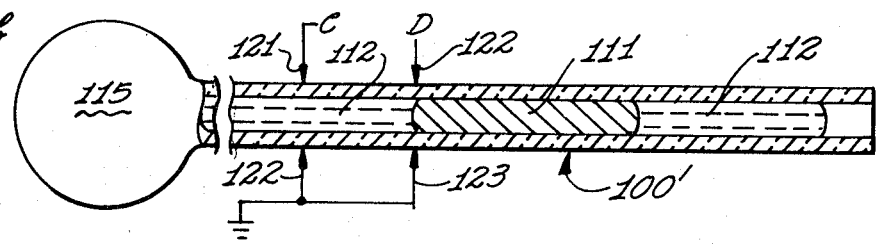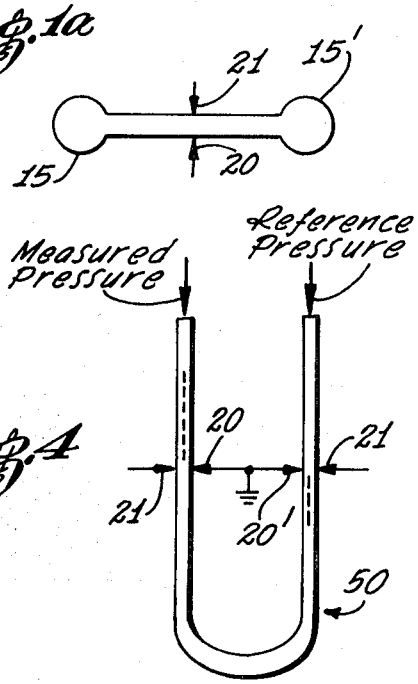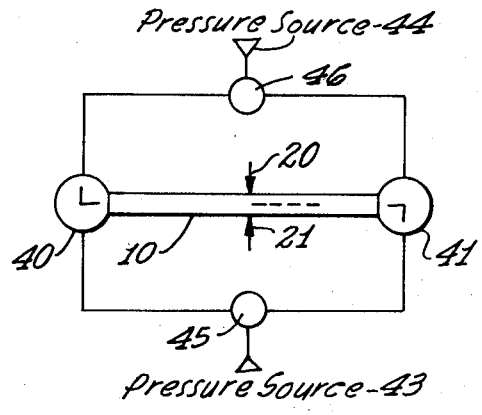

LIQUID DISPLACEMENT ENCODER

The present invention relates to apparatus for sensing and measuring the displacement of liquid in a tube and to provide digital representation thereof.

The displacement of a liquid column, particularly of a boundary (meniscus) thereof is used frequently to measure fluid expansion and contraction in representation of pressure and/or temperature. The acquisition of a digital representation requires usually placement of a large number of contacts or pickup electrodes along the tube, separated from each other by interelectrode spacing that represents the accuracy or resolution of measurement. Each pickup electrode must pertain to a different electric circuit to permit distinctive recognition of the position of the liquid column in the tube. The entire range of meniscus displacement of interest defines the full scale equivalent of measurement along the tube and must be covered by these electrodes. Furthermore, there must be a corresponding number of signal generating and processing circuits connected individually to these electrodes. Other detecting systems use plural probing beams of radiation across the tube, selectively absorbed by liquid, or the liquid serves as variable diaphragm to obtain an analog readout signal.

The present invention suggests a different and considerably simpler approach. The basic element of the invention is a capillary whose two ends are subjected to differently expanding and contracting fluids to displace the content of the capillary. That content is comprised of a plurality of small, elemental liquid columns, separated from each other by a second plurality of different liquid columns. The two liquids have specific distinct, detectable characteristics, such as different electrical conductivity, different coefficient of absorption of light, generally or for specific wavelength etc. Most importantly, the two liquids must be immiscible to remain separate. Stationary pickup means are provided to act across the tubes diameter thereby establishing a particular deJection range for detecting absence of one or the other type liquid column in its range. The resulting output represents a digit of low significance for digital representation of the liquid displacement in the capillary. The total scale range covered by the displacement meter is represented by the total length occupied by these different type columns.

For practical reasons, one will use two types of liquids to establish the two sets of interdigitized elemental columns. Consequently, direct digital readout of liquid displacement in that capillary yields bivalued digits. However, one could use three or more different liquids to provide a base-3 or higher number system.

The two ends of the capillary are directly or indirectly exposed to fluids that may contract or expand into the capillary, independently from each other, to displace the assembly of elemental columns therein. These fluids on either or both ends of the capillary may be confined to establish a confined fluid reservoir of predetermined dimensions, to be part of the system. Alternatively, either or both ends may be subjected directly or indirectly to different, open-end sources of pressure. The particular mode of operation will depend upon employment of the capillary as will be developed more fully below.

For completion of the system it is necessary to establish concurrently digital representation of higher significance and to establish a zero position for the scale. For example, the number of elemental columns of the first liquid type, when passing the pickup means, are counted, after having set the counter to zero with all elemental columns on one side of the pickup means or centrally located thereto. The counter should be bidirectional and the pickup means should be constructed to ascertain also the direction of a displacement in the capillary.

Alternatively, the capillary may be duplicated (or multiplied) with the respective ends subjected to the same fluid pressures or pressure differential and displacement action. These additional capillary or capillaries contain additional elemental liquid columns of different types, but at a greater length. Each additional capillary has also a pickup means to ascertain the position of the respective columns therein, so as to obtain higher significant digits for the digital representation. In the simplest form the different type columns in the different capillaries are dimensioned and arranged to obtain a binary scale readout, the columns in the second capillary having twice the length of the elemental columns in the principal capillary, the columns in the third capillary having twice the length of the columns in the second one, etc. However, the assembly of distinctive columns in all capillaries occupy the same longitudinal displacement range defining the total scale range.

The resolution of the capillary with distinct columns of smallest size is per se limited by the requirement of minimum length for the elemental columns, depending upon the fluid mechanics in the capillary. An additional pair of pickup means, and/or selection of particular phase of columns in additional capillaries can be used to increase, e.g., double resolution.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a first example of the preferred embodiment of the present invention;

FIG. 1a illustrates schematically a particular mode of employment of the capillary in FIG. 1;

FIG. 2 illustrates a modified example of the preferred embodiment of the present invention;

FIG. 2a illustrates a timing diagram of signals developed in the embodiment shown in FIG. 2;

FIG. 2b illustrates a modification of FIG. 2;

FIG 3 illustrates schematically apparatus to adjust the liquid columns in a capillary;

FIG. 4 illustrates a gravity balanced system in accordance with the principal aspects explained with reference to FIG 1;

FIG. 5 illustrates schematically a modified pickup arrangement; and

FIG. 6 illustrates employment of a system as explained for indirect pressure measurement in a protective enclosure.

Proceeding now to the detailed description of the drawings, in FIG. 1 thereof is illustrated a first embodiment of the present invention. A first basic element or subsystem is shown in the upper part of FIG. 1 and in considerable detail. There is first a capillary tube 10 made of, for example, glass or any other material compatible with its content and subject to requirements related to purpose and function of that content. Elongated tube 10 contains a particular plurality of elemental liquid columns 11 of a first liquid, separated from each other by a plurality of elemental spacer columns 12 of a second liquid.

The elemental columns 11 are similar in size among each other, so are columns 12, which are also similar in size to columns 11. Of course, tube 10 has uniform internal diameter, so that similarity in size of these columns refers to their respective axial dimension, i.e., length. The particular tube 10 established a scaling unit for displacement encoding, and the total length of space occupied by all of these columns defines the total range of the scale. As the length of each elemental column is instrumental in establishing the resolution of the system, they are to be as small as possible.

As a general rule, each of the columns 11 and 12 must have length at least 1.5 of the tube's diameter. In other words, the several elemental liquid columns must be at least as large as necessary to prevent formation of a droplet causing two columns of the other type to merge. The tube itself is a capillary. The columns 11 do not have to have the same length as the columns 12, but it is convenient to choose equal length. Particularly, because each of the columns should have minimum length as the sum of the length of one column 11 and of one column 12 defines the scaling unit length as established by this particular system. Of course, it may become desirable to increase the margin of safety as to minimum length of an elemental column of one type of liquid so that the particular columns are somewhat longer.

The two liquids must be immiscible and must not react with each other. Moreover, they should have additional easily detectable difference in a particular characteristic. For example, they should have a significant difference in conductivity, or they should have different radiation absorption properties. For example, their transmittance of light or of light of particular wavelength should differ. Presently, in the embodiment of FIG. 1, of a difference in conductance is presumed, requiring, of course, tube 10 to be an insulator.

Neither of the liquids should wet the internal surface of the capillary, at least not significantly, and their surface tension should not differ significantly, though lengthening of the elemental columns (or decreasing the diameter of the capillary) may suffice to prevent merging of two columns of one type liquid around the column that should separate them. By way of example, one of the liquids, e.g., the one forming columns 11 may be mercury, the other liquid may be water, or alcohol, silicone oil or the like.

It may be convenient to call columns 11 the principal elemental scale units defining columns, while columns 12 are the spacer columns, though this is basically arbitrary. A unit length displacement is, thus, given by the length of a column 11 plus the length of a column 12. Assuming, each of them to be of minimum size, about 1½ the tube's diameter D, then this displacement unit length is the equivalent of about $D^3$ as volume displacement unit. Doubling the resolution will be explained below.

For reasons of simplification, the number of columns 11 is equal to the number of columns 12. The total number of pairs of elemental columns, 11 and 12, times the length of such a pair defines the total full length of the scale covered by the encoding arrangement. Capillary tube 10 must be at least twice that long. Liquid plugs 13 and 14 are provided to separate the encoder column arrangement from the environment. This, however, is mentioned here only for reasons of completion and may not be necessary in individual cases. Moreover, columns 11 themselves may serve as plugs on each end, with one thereof having equivalent function of a leading marker for establishing zero position of the scale defining columns as a whole.

The environment, from which the elemental encoder columns are to be separated, is defined by the control of tube 10 at the two ends of the capillary. On one side, tube 10 may terminate in a flask 15, containing a particular fluid 16, that is compressible and/or has a particular coefficient of thermal expansion, depending upon the employment of the equipment. For many cases, the fluid may be water or silicone oil. However, in many instances, a gas may be required. As can be seen, plug and separation column 14 may be needed in that case.

Assuming the arrangement is to be used as a pressure gauge or meter, fluid 16 as confined in flask 15, provides and establishes reference and balancing pressure. That may be the function generally of fluid in communication with the tube 10 on that side, and it is merely a matter of use particulars, whether or not that fluid 16 is in fact confined in a closed system or subject to controlled pressure variation as will be described.

While basically arbitrary, the left-hand side of the capillary may be regarded as being subject to a source of reference pressure in case the arrangement is used as pressure meter. The right-hand end 18 of the tube is then exposed to the pressure to be measured. As the fluid in flask 15 is compressed to assume the same pressure as applied to the measuring opening 18 of tube 10, columns 11 and 12 are displaced accordingly, to left in the drawing. Depending upon the type of fluid that exercises measuring pressure through opening 18, plug 13 may or may not be needed. It can be seen that the liquids constituting columns 11 and 12 should be relatively incompressible. However, it will be appreciated, that the relative volume occupied by columns 11 and 12 in capillary 10 is, or can be made, to be quite small as compared with the volume of flask 15. This way, the relative volume change of the columns 11 and 12 becomes negligible. Moreover, for example, the columns 11 can be made dissimilar, slightly increasing in length from the left to the right, so as to offset dimension distortion due to relative high pressure when acting on opening 18.

In case of thermometry, the capillary tube is operated essentially on an overall isobaric basis as to each end. Flask 15 generally may contain a specific quantity of fluid that serves as measuring medium, expanding and contracting due to temperature variations at a particular rate; correspondingly a particularly expanding and contracting column of fluid 16 extends into tube 10 and shifts the scale defining elemental columns therein.

Still in case of thermometry, the right-hand end 18 of tube 10 may be open and may be exposed directly to environmental temperature condition. Alternatively, there may be a second flask 15' (see FIG. 1a) containing similar fluid or a different one. This way, a differential thermometer is obtained operating on basis of a resulting pressure differential in the flasks 15 and 15', causing a relative change in volume so that the columns 11 and 12 are displaced in tube 10 and balance will, thus, be restored in a manner indicative of thermal conditions.

The plurality of alternatingly disposed elemental columns 11 and 12 establish a displaceable scale, following the liquid displacement on either end of the capillary for reasons of temperature and/or pressure changes of the media acting on the two ends.

The displacement may also be produced by inertia of liquid in flask 15 and tube 10 to establish an accelerometer. The column displacement is detected by and in relation to the position of a pair of probes 20 and 21, traversing the wall of tube 10 and facing each other across the capillary. The probes are preferably made of platinum. The exposed internal surfaces of probes 20 and 21 are interconnected electrically by a column 11 when disposed in between, the electrodes are in effect disconnected by a column 12 accordingly. The electrodes establish an electrical pickup means and their exposed surfaces should be smaller than the length of each column, particularly smaller than columns 12 providing electrical insulation.

Probe 20 is connected to ground or reference potential, probe 21 is connected to a voltage source B+ via a resistor 22. The polarity of this biasing source is immaterial. Thus, probe 21 is "high" when electrically disconnected from probe 20 by a low-conductance column 12, probe 21 is "low" when connected to probe 20 by a high-conductance column 11. It is likewise immaterial which signal level is counted as a "1" and which is a "0." The digital, bivalued output is denoted A.

The length of the scale is defined by the total length of columns 11 and 12, which, in turn, defines full scale or total range for the measurement. When all of the columns 11 and 12 are to the right of the probes 20–21 (as illustrated), the scale is at one end in relation to pickup 20–21. This position is the low-pressure point as to the fluid in flask 15. The other, high-pressure limit of the scale is reached when all columns 11 and 12 are to the left of the probes.

In the specific example, "plug" 14 may also be an insulating liquid, so that zero scale value is established by a "high" output A. One will choose this arrangement in case fluid 16 is likewise conductive to some extent, as fluid 16 may have been selected on a different basis; its pressure and/or temperature behavior is more important than its electrical characteristics. In case fluid 16 is also an insulator, it may be more advisable to select the first conductive column 11 as zero defining scale marker.

In the general case, the measuring device has a plurality of columns 11 and 12, possibly a rather large plurality of these elemental columns defining low-order bivalued digits of the digital, liquid displacement measuring device. It is, thus, necessary to provide for high-order bits. This can be done on a cumulative, temporal basis or on a spatial-parallel basis. The latter method is depicted in FIG. 1. In particular, there are shown additional tubes 100, 200, 300, for defining digits of higher significance in and of the digital representation sought to be established.

In particular, the capillary tubes 100, 200 and 300 are provided to complete a gray code scale so that the least significant bit value of that representation has half the value of the bit value established by scaling tube 10 per se. A different mode of halving the least significant bit value will be explained below with reference to FIG. 2.

Tube 100 has conductive columns 211, 311, respectively, bounded by insulating spacer columns 212 and 312 to complete the scale length in each tube. The spacer columns 212 may, in fact, serve as plugs for this particular scale length. The several tubes are shown in particular, physical alignment, which aids in the understanding of the invention, but this is not a structural necessity.

Each tube has a pair of pickup electrodes or probes 120–121, 220–221, 320–321. Important is, that the several columns in these tubes are disposed in particular phase relation to these pickup electrodes for the same pressure and/or temperature conditions. The tubes 100, 200, 300 are respectively provided with flasks 115, 215, 315 filled with the same liquid 16, and the right-hand end of each tube is exposed to the same environment or conditions as is that end of tube 10.

Under these conditions, the phase relation is selected so that in case the leading edge of the first column 11 is about flush with the electrodes 20–21, the first column 111 is displaced for half a column length of columns 11 from electrodes 120–121; column 211 is displaced for a full column length 11 from electrodes 220–221, and column 311 is displaced for a full length away from electrodes 320–321, as column 311 biparts the full scale length.

The outputs of the electrodes are denoted A, B, C, D. These outputs are applied to individual pulse shapers 31 to which a digital readout unit 30 is connected. These four bits define the column displacement in a four-bit gray code, at a 1:16 full scale resolution. The reason for a unit distance code such as the gray code is that the resolution is higher by a factor of 2 than the resolution of the scale defined in tube 10 per se. Assuming that columns 11 and 12 have the physically permissible minimum size of about 1.5 of the tube's diameter D, then the resolution is, in fact, reduced below the tube's diameter. The scale unit of volume displacement is about ½ $D^3$.

The dimensions for the capillaries and columns therein establishing digits of higher significance have been chosen on basis of similarity of the fluids 16 in all flasks. However, in case fluid in the flasks 15, 115, 215, 315, is chosen with differing parameters, compressibility or coefficient of thermal expansion, the dimensions for the elemental columns therein must be modified accordingly. Decisive is that displacements remain comparable and that the relations remain constant.

The upper tube 10' in FIG. 2 resembles tube 10 in FIG. 1 and is used to explain how resolution can be enchanced differently. The tube 10' is presumed to have the same scale defining columns 11 and 12, and there is also the pair of electrodes 20–21. However, there is a second pair of electrodes 22–23 disposed in the tube displaced from the location of electrodes 20–21, by an odd-numbered multiple of half a column length, for example, for 1½ column length. Electrode 23 is connected to electrode 21 (which is connected to ground) while a separate signal can be derived from electrode 22. That signal be denoted B.

The two electrodes 21 and 22 feed their respective signals to pulse shaping, or squaring, circuits 31A and 31B. Electrodes 21 and 22 together read the scale on a modulo-four basis, the unit being defined by half the length of a column (11 and 12) and the sum of the length of a column 11 and of a column 12 defines the spatial repetition cycle of the two-bit code pattern A and B.

FIG. 2a illustrates the output signals A and B as defining a base-4 number system for the least significant bits having value equivalent to half an elemental column length. Specifically one can see from FIG. 2a that a new four-bit cycle begins, for example, when $\overline{A} \to A$ or $A \to \overline{A}$ on $\overline{B}=1$. $\overline{A} \to A$ represents a scale shift to the left (corresponding to increasing measuring pressure). $A \to \overline{A}$ represents correspondingly a scale shift to the right or pressure decrease. These two different changes are monitored by detector stages 33 and 34, respectively responding to signal edges $\overline{A} \to A$, $A \to \overline{A}$. The output of stage 33 is AND gated on $\overline{B}$ to serve as up-counting input for a counter 35, the output of stage 34 is AND gated on $\overline{B}$ to serve as down-counting input for counter 35.

The counter, thus, has state representative of the higher significant digits. Its range, of course, represents the full scale length. The stages 33 and 34 could be analog-type differentiating stages in case expected liquid displacements occur rather fast. However, this cannot be relied upon and pulse edge detection could be carried out digitally, for example, by temporarily storing the state $\overline{A} \cdot \overline{B}$ and detecting $A \cdot \overline{B}$, but inhibiting any such detection on $B \to 1$ for up-counting. Down-counting can be carried out and controlled analogously. The pulse shaper circuits 31A and 31B should have artificial hysteresis to prevent multiple counter triggering in case of scale oscillations.

The particular arrangement shown in FIG. 2b is provided to supplement the displacement gauge of FIG. 2 to provide a different type of formation of digits of higher significance, thus, obviating elements 33, 34 and 35.

A pair of bits of higher significance may be produced instead by means of a second capillary 100' having two sets of pickup electrodes 120–121 and 122–123, which are spaced apart by double the length of an elemental column in tube 10' (i.e., by the length of one column 11 plus the length of one column 12). There is at least one elemental column 111' in capillary 100' having length of two columns 11 plus the length of two columns 12. Separation columns 112 are disposed on either side of each column 111'.

A liquid displacement encoder can be made essentially through appropriate control of filling the capillary with liquid. As filling rates can be controlled through electrically operated valves in the order of nanoliters, formation of large numbers of similar size elemental liquid columns and particular multiple thereof does not present any principal problem.

As shown schematically in FIG. 3, an encoder column assembly after having been placed into a capillary 10, may require particular adjustment relative to the electrodes to establish a zero position. Therefore, the capillary tube 10 (or any of the other type tubes as explained) is placed between two three-way valves 40 and 41 that can selectively connect one or the other end of tube 10 to a high-pressure source 43, while the respective other end of tube 10 is connected to a lower pressure source 44. Through appropriate manipulation of master valves 45 and 46, and upon particular setting of valves 40 and 41, the columns are shifted into appropriate position relative to pickup electrodes 20, 21. In order to facilitate calibration, it may be advisable to use a first elemental column of the conductive type as a zero marker as was mentioned above. For the same reason, a similar minimum size elemental column, such as 11, may be included as zero marker in each of the various capillaries 100, 100', 200 etc. defining higher significance digits at larger columns.

The zero position is not necessarily one in which all elemental, scale defining columns are to one side of the pickup means. Instead, the center of the column assembly may the zero position to obtain positive and negative valued scale readout. It can readily be seen that this is merely a matter of initial adjustment, placing the column assembly in desired relative position to the pickup means.

In case a liquid displacement encoder of the type described is not necessarily being disposed in a horizontal position when in use, difference in weight must be considered. Two capillaries, possibly having differently long elemental columns have one end each interconnected to form a U-shaped arrangement 50 with a buffer liquid in between, for example, of the type used to establish spacer columns. The other two ends respectively connect to measuring and reference pressure sources. The column assemblies are schematically denoted 51 and 52 and are presumed to be arranged to define two bits of a binary scale. In the illustrated zero position, column assembly 51 is above the pickup means 20–21, the column assembly 52 is below pickup means 20', 21'. Each column assembly runs through the scale in different directions.

The embodiments above have been described with electrical readout, whereby the elemental scaling columns and the respectively interspaced elemental spacer column had to have different electrical conductivity, the readout being done on a DC basis. The liquids may differ in in other respects. For example, they may have different dielectric constant, whereby an AC bias is applied to the electrodes. A change in impedance represents a half unit shift in the capillary.

The two liquids may have different optical properties and, as shown in FIG. 5, a pencil beam 62 of radiation, for example, light is materially attenuated by one type of liquid, but transmitted by the other type. The light that is permitted to pass enters a photocell 61 providing an appropriate output.

The "Free" opening of a capillary may not necessarily directly be exposed to the pressure to be measured. This may be particularly so if the fluid is chemically active and corrosive, such as ocean water. In this case, the multiple capillaries with reference pressure flask are immersed in a vessel 70, as shown in FIG. 6, having a displaceable, piston-type wall 71 or a diaphragm. The interior of that vessel is filled with a liquid or gas 72 compatible with the instrumentation therein and serves as pressure transmitter. That pressure gauging instrumentation may be as shown in FIG. 1 or FIG. 2, directly or as modified in accordance with the various aspects outlined above.

The invention is not limited to the embodiments described above but all changes and modifications thereof not constituting departures from the spirit and scope of the invention are intended to be included.

I claim:

1. A liquid displacement encoder, comprising:
 a capillary tube having first and second ends each exposed to expanding and contracting fluids;
 a plurality of first elemental columns of a first liquid in the tube disposed therein in regular, spaced-apart relationship and occupying a particular length in the tube equivalent of the scale length of the encoder, there being a first and a last of the columns of the first plurality respectively closest to the first and second end of the tube but in physical separation from each of the expanding fluids;
 a plurality of elemental columns of a second liquid interposed between the first elemental columns in the tube, the first and second liquids being immiscible and having different particularly detectable characteristics, the first and second alternatingly spaced columns together establishing the length of a scale;
 pickup means operatively coupled to the tube and effective across the tube's diameter over an area smaller than the length of any of the columns to detect absence of a first or of a second column in a particular location of the tube, the scale as defined by the columns of the pluralities having particular scale reference value when in a particular relative position to the pickup means;
 first means connected to the pickup means to derive therefrom digital representation of low significance of the relative position of the plurality of columns in the tube; and
 second means operatively coupled to the first means and likewise operating in response to the balance of fluid expansion and contraction to provide digital representation of the relative displacement of higher significance.

2. A liquid encoder as in claim 1, the first columns of liquid having length approximately 1½ the diameter of the capillary.

3. A liquid encoder as in claim 1, the first and second columns having similar length, each in excess of the diameter of the capillary.

4. A liquid encoder as in claim 1, the pickup means including a pair f electrodes, there being electrical means to bias the electrodes, the first and second liquids having different conductivity, the electrodes responsive to conductance through the capillary across the diameter.

5. A liquid encoder as in claim 1, the pickup means providing a radiation beam across the tube and detecting absorption therein, the first and second liquids differing in transmittance of the radiation.

6. A liquid encoder as in claim 3, the pickup means including first and second pickup means disposed by an odd-numbered multiple of half a column length apart from each other along the tube.

7. A liquid encoder as in claim 1, the second means including counter means connected to the pickup means and responsive to directional displacement of the columns in the capillary to obtain higher significant digits.

8. A liquid encoder as in claim 1, the first end merging into a flask filled with a particular fluid balancing the position of the columns in the capillary in their relative position to the second end and to the pickup means.

9. A liquid encoder as in claim 8, the second end of the capillary merging into a second fluid-filled flask.

10. A liquid encoder as in claim 1, there being means to provide controlled pressure to the first and second ends of the capillary.

11. A liquid encoder as in claim 1, the second means including a second capillary having ends exposed to the fluids acting on the first capillary, the second capillary having at least one first liquid column, having length which is an integral multiple of the length of the first column of the first capillary, and having pickup means oriented to the first column in the second capillary to establish a phase relation thereto to establish a higher significant digit for the measurement established by the relation between pickup means and first columns in the first capillary.

12. A liquid encoder as in claim 1, including a second capillary having ends exposed to the fluids acting on the first capillary, and including columns of different liquids, there being second pickup means, the columns in the second capillary having position relative to the second pickup means, corresponding to a phase shift as between the columns in the first capillary and the first pickup means.

* * * * *